March 7, 1961   F. M. JULIAN ET AL   2,974,163
PRODUCTION OF PARA-CHLOROPHENYL CARBAMYL CHLORIDE
Filed Aug. 11, 1958
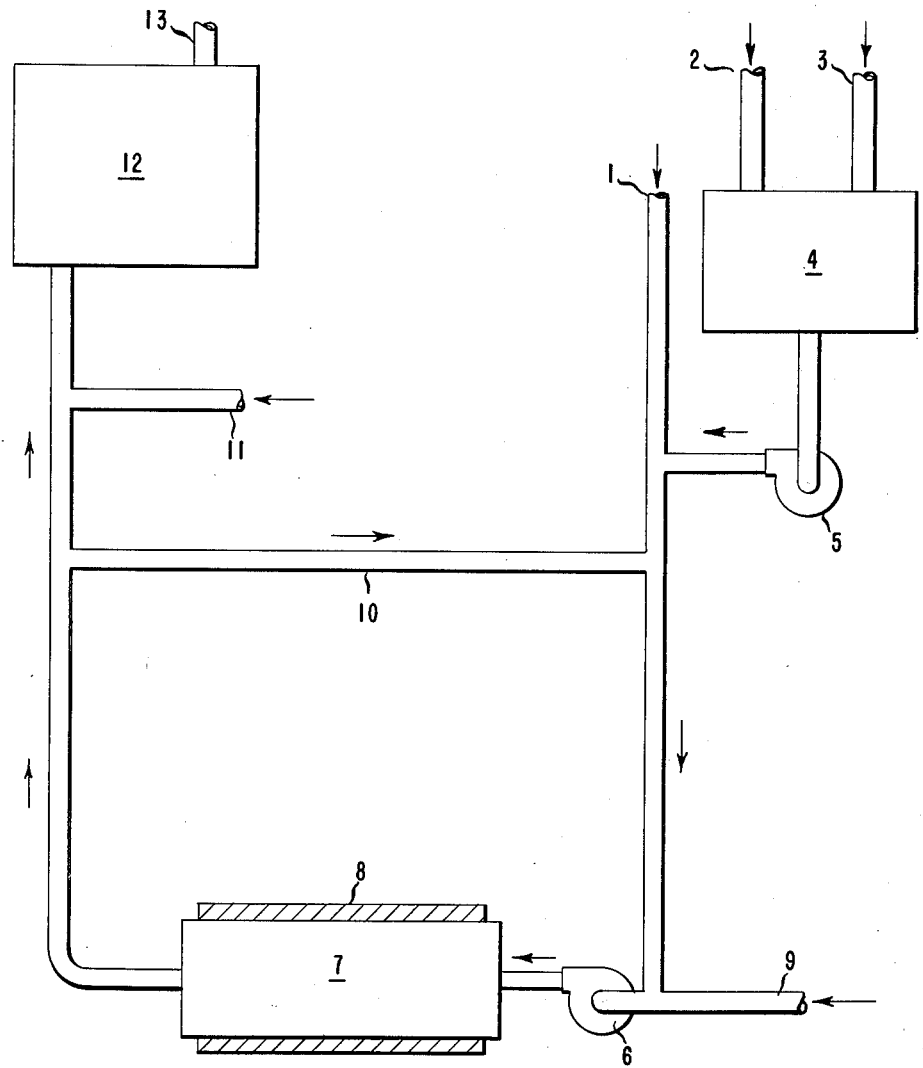
INVENTORS
FRANK M. JULIAN
HOWARD T. SIEFEN
BY  *John E. Griffiths*
ATTORNEY

United States Patent Office 2,974,163
Patented Mar. 7, 1961

2,974,163
PRODUCTION OF PARA-CHLOROPHENYL CARBAMYL CHLORIDE

Frank M. Julian and Howard T. Siefen, Pasadena, Tex., assignors to E. I. du Pont de Nemours and Company, Wilmington, Del., a corporation of Delaware Filed Aug. 11, 1958, Ser. No. 754,453

3 Claims. (Cl. 260—544)

This invention relates to a process for the preparation of substituted phenyl carbamyl chlorides. More particularly, it relates to a process for reacting chlorine with an aromatic isocyanate under specific process conditions found unexpectedly to effect a significant increase in yield in the carbamyl chloride product.

The general reaction of phenyl isocyanate and chlorine to produce a mixture of ortho- and para-chlorophenyl carbamyl chlorides is known.

I have now discovered that outstanding advantages are obtained when this reaction is carried out in a two-step process wherein (1) in the first step, from 80% to 98% of the chlorination of the phenyl isocyanate takes place at a temperature maintained below 15° C., and preferably between —15° C. and 15° C., wherein the reactants in the first step are moving at a minimum velocity of 5 feet per second, and preferably at a velocity of from 8 to 15 feet per second, wherein a portion of the throughput of the first step is recycled through the first step with the recycled portion being maintained in a quantity sufficient to provide at least half as much unchlorinated phenyl isocyanate as is being initially fed into the first step, and (2) in the second step, from 2% to 20% (the balance) of the chlorine needed to chlorinate the unchlorinated phenyl isocyanate remaining in the reaction product is added subsequent to the first step and its recycle operation.

The above particular combination of process conditions results in the production, in a continuous process if desired, of para-chlorophenyl carbamyl chloride of high purity and optimum yield. The reason why the particular process conditions of this invention yield a product rich in para isomer and poor in ortho isomer is not known, but each of the recited process conditions is believed to contribute in a necessary manner to the overall improved results. Thus:

(1) It is important that only a portion of the necessary chlorine be added in a first step, and the remainder in a second step, in order to avoid over-chlorination, particularly localized over-chlorination, in a single step, with resultant undesirable by-products;

(2) The relatively cold temperature required for the first step and set forth above is important, since it has been unexpectedly found that production yields decrease significantly and steadily at higher temperatures while lower temperatures are considered uneconomic;

(3) The relatively high speed of forward motion of the reactants through the first step of the process is important since it has been observed that the entire process unsatisfactorily breaks down at lower speeds;

(4) The recycle operation, with its requirement of unchlorinated phenyl isocyanate being recycled, is highly important since it assures that a large excess of phenyl isocyanate is always present throughout the entire procedure, avoiding high concentrations of chlorine and thus minimizing by-product formation and improving yields; and (5) The final addition of the remainder of the chlorine in the second or final step of the process, after an opportunity for analysis of the reaction product, permits over-all control of product uniformity not heretofore attainable in prior art processes.

In a restatement of the process whereby the above described conditions are maintained, this invention includes continuously (a) introducing into a first reaction zone phenyl isocyanate in an inert organic solvent and from 80% to 98% of the theoretical amount of chlorine required to react with all of the phenyl isocyanate, (b) maintaining the first reaction zone at a temperature below 15° C., and preferably between —15° and 15° C., (c) moving the phenyl isocyanate and chlorine through the first reaction zone at a minimum velocity of 5 feet per second, and preferably from 8 to 15 feet per second, whereby a portion of the phenyl isocyanate and the chlorine react to form chlorophenyl carbamyl chloride, (d) recycling back into the first reaction zone an amount of the materials leaving the first reaction zone, the amount being recycled being sufficient to reintroduce into the first reaction zone at least half as much unchlorinated phenyl isocyanate as is initially introduced into the first reaction zone, (e) drawing off a portion of the materials leaving the first reaction zone and (f) combining this portion with additional chlorine in an amount from 2% to 20% of the theoretical amount of chlorine required to react with all of the phenyl isocyanate, this amount being just sufficient to complete the chlorination of the phenyl isocyanate to obtain optimum yield of the desired product, para-chlorophenyl carbamyl chloride.

The product can, of course, if desired, be converted by dehydrohalogenation, with the evolvement of hydrogen chloride, to form para-chlorophenyl isocyanate, which in turn can be aminated by known processes to make highly useful substituted phenylurea herbicides.

The process of this invention can be more clearly understood by reference to the accompanying drawing, which illustrates one embodiment of apparatus particularly suitable for the practice of the invention.

Referring now to the drawing, a solution of phenyl isocyanate in a suitable inert organic solvent is continuously introduced into the system through inlet 1. These materials can be newly prepared, as by a batch process, or they can be introduced directly from prior steps of a continuous process, as will be understood.

Simultaneously, additional solvent and, if desired, a suitable chlorination reaction catalyst, such as ferric chloride, antimony, trichloride, antimony pentachloride, stannic chloride, etc., or the like, are introduced respectively through inlets 2 and 3, through mixing vessel 4, and fed into the system under the urging of feed pump 5. These "raw materials" for the reaction can be conveniently supplemented, if desired, by additional recycled solvent and catalyst coming from subsequent process steps, for greater economy.

The raw material mixture is continuously pumped by any suitable means, such as centrifugal pump 6, through a first reaction zone comprised of heat exchanger 7 having a suitable jacket 8 for the circulation of a heat exchange medium, such as a liquid like water, brine, "Freon," etc. Eighty to 98% of the theoretical chlorine required to react with all of the phenyl isocyanate is added to the mixture through inlet 9 at the intake of pump 6 or alternatively at the discharge side of pump 6. Pump 6 serves to maintain the velocity of the circulating materials at the high rate required for the carrying out of this invention.

The reaction mass leaving heat exchanger 7 is partially circulated back through conduit 10 into the beginning portion of the system. As stated above, the recirculation rate is sufficient to insure that the amount of unreacted phenyl isocyanate in the recycle chlorinate is at least equal to half of the fresh phenyl isocyanate being introduced into the system. For example, if 95% of the phenyl isocyanate is chlorinated in the first reaction zone (the first stage of the process) and the ratio of recycle chlorinate to fresh phenyl isocyanate is 20:1, then the ratio of recycled phenyl isocyanate to fresh phenyl isocyanate is 1:1. If 95% of theoretical chlorine requirement is added in this first stage of the process, the ratio of phenyl isocyanate present to chlorine added is 2:0.95 or 1:0.475.

The partially chlorinated mixture is continuously drawn off, and sufficient chlorine added through feed pipe 11 to complete the chlorination, and to thereby obtain the optimum yield of the final product, which can be collected by any suitable means such as hold-up tank 12, from which it can be drawn off as desired, as for subsequent processing as described above, through outlet 13.

The inert organic carrier solvent employed can be varied widely and can be aliphatic or aromatic. By inert is meant that the solvent is not significantly reactive with chlorine. For practical purposes, the solvent is one that boils above about 75° C. Suitable aliphatic solvents include acetylene tetrachloride, chloroform, carbon tetrachloride, hexachloroethane, and the like. Suitable other solvents include, for example, chlorinated aromatic hydrocarbons such as monochlorobenzene, orthodichlorobenzene, trichlorobenzene, monochlorotoluenes, and other substituted aromatic hydrocarbons such as nitrobenzene.

It is preferred that the entire process of this invention be carried out under a pressure greater than atmospheric, and preferably from 1/100 of an atmosphere to 5 atmospheres of pressure. Lower and higher pressures can of course be used.

In order that the invention may be better understood, the following examples are given in addition to those already set forth above:

Example 1

Using apparatus of the type illustrated in the drawing, a solution of 14 parts by weight phenylisocyanate in 86 parts by weight of ortho-dichlorobenzene is introduced into the system through inlet 1. A solution of 0.3 part by weight of iodine catalyst in 6 parts by weight of ortho-dichlorobenzene is introduced through vessel 4. These solutions are combined and joined by 2,500 parts by weight of a slurry from conduit 10 resulting from the partial chlorination of the phenyl isocyanate in an earlier cycle. The resulting mixture is continuously pumped by means of centrifugal pump 6 through heat exchanger 7 which is maintained at a temperature of 10–15° C. by coolant circulating through jacket 8. Eight parts by weight of chlorine are added to the aforementioned mixture at the discharge of pump 6. The entire contents are moved through exchanger 7 at a velocity of 9–11 ft./sec. 2,500 parts by weight of the material leaving exchanger 7 are recycled through conduit 10 back to the process, as indicated above. The recycle portion is in an amount that provides unreacted phenylisocyanate in conduit 10 equal to 100% of the amount of phenylisocyanate entering inlet 1.

106.3 parts by weight of the partially chlorinated mixture leaving exchanger 7 are continuously drawn off and combined with 1 part by weight of chlorine from feed pipe 11, the chlorine being in an amount of 12% of theoretical. The resultant product is analyzed as a high yield of relatively pure para-chlorophenyl carbamyl chloride.

Example 2

Using apparatus of the type illustrated in the drawing, a solution of 16 parts by weight phenylisocyanate and 84 parts by weight acetylene tetrachloride is introduced into the system through inlet 1. A solution of 0.2 part by weight iodine catalyst in 10 parts by weight acetylene tetrachloride is introduced through vessel 4. These solutions are combined and joined by 3,000 parts by weight of a slurry from conduit 10 resulting from the partial chlorination of the phenylisocyanate in an earlier cycle. The resulting mixture is continuously pumped by means of a centrifugal pump 6 through heat exchanger 7 which is maintained at a temperature of 10–15° C. by a coolant circulating through jacket 8.

Nine parts by weight of chlorine are added to the aforementioned mixture at the discharge of pump 6. The entire contents are moved through exchanger 7 at a velocity of 12–14 ft./sec.

Three thousand parts by weight of the material leaving exchanger 7 are recycled through conduit 10 back into the process, as indicated above. The recycle portion is in an amount that provides unreacted phenylisocyanate in conduit 10 equal to approximately 170% of the amount of phenylisocyanate entering inlet 1.

119.2 parts by weight of the partially chlorinated mixture leaving exchanger 7 are continuously drawn off and combined with 1 part by weight of chlorine from feed pipe 11, the chlorine being in an amount 10.5% of theoretical. The resultant product is analyzed as a high yield of relatively pure para-chlorophenyl carbamyl chloride.

Example 3

Using apparatus of the type illustrated in the drawing, a solution of 12 parts by weight of phenylisocyanate in 88 parts by weight of mixed trichlorobenzenes is introduced into the system through inlet 1. A suspension of 0.5 part by weight of ferric chloride catalyst in 10 parts by weight of mixed trichlorobenzene is introduced through vessel 4. These mixtures are combined and joined by 4,000 parts by weight of a slurry from conduit 10 resulting from the partial chlorination of the phenylisocyanate in an earlier cycle. The resulting mixture is continuously pumped by means of a centrifugal pump 6 through heat exchanger 7 which is maintained at a temperature of 5–10° C. by a coolant circulating through jacket 8. Seven parts by weight of chlorine are added to the aforementioned mixture at the intake of pump 6. The entire contents passing pump 6 are moved through exchanger 7 at a velocity of 8–10 ft./sec.

Four thousand parts by weight of the material leaving exchanger 7 is recycled through conduit 10 back into the process, as indicated above. The recycle portion is in an amount that provides unreacted phenylisocyanate in conduit 10 equal to approximately 150% of the amount of phenylisocyanate entering inlet 1.

117.5 parts by weight of the partially chlorinated mixture leaving exchanger 7 are continuously drawn off and combined with one part by weight of chlorine from feed pump 11, the chlorine being in an amount 14.0% of theoretical. The resultant product is analyzed as a high yield of relatively pure para-chlorophenyl carbamyl chloride.

The invention claimed is:

1. The process comprising continuously (a) introducing into a reaction zone phenyl isocyanate in an inert organic solvent and from 80% to 98% of the theoretical amount of chlorine required to react with all of said phenyl isocyanate, (b) maintaining said reaction zone at a temperature below about 15° C. throughout said process while contacting said phenyl isocyanate and said chlorine with a catalytic amount of a chlorination reaction catalyst selected from the group consisting of iodine, ferric chloride, antimony trichloride, antimony pentachloride and stannic chloride, (c) moving said phenyl isocyanate and said chlorine through said reaction zone at a velocity greater than 5 ft./sec., (d) recycling back into said reaction zone an amount of the materials leaving said reaction zone, said amount being recycled being sufficient to reintroduce into said reaction zone at least half as much unchlorinated phenyl isocyanate as is initially introduced into said reaction zone, (e) drawing off a portion of the material leaving said reaction zone, and (f) combining said portion with additional chlorine in an amount from 2% to 20% of the theoretical amount of chlorine required to react with all of said phenyl isocyanate, said additional chlorine amount being sufficient to complete the chlorination of said phenyl isocyanate.

2. The process as set forth in claim 1 wherein said solvent is monochlorobenzene.

3. The process as set forth in claim 1 wherein said process is carried out under a pressure of from $\frac{1}{100}$ of an atmosphere to 5 atmospheres.

References Cited in the file of this patent

Gumpert: J. Pract. Chem. (2), 32, 294–97 (1885).